O. W. RICHARDSON.
Sample Exhibitor.

No. 210,362.     Patented Nov. 26, 1878.

Attest:

INVENTOR:
Orlo W. Richardson
By F. F. Warner, his
Attorney.

UNITED STATES PATENT OFFICE.

ORLO W. RICHARDSON, OF CHICAGO, ILLINOIS.

IMPROVEMENT IN SAMPLE-EXHIBITORS.

Specification forming part of Letters Patent No. 210,362, dated November 26, 1878; application filed March 9, 1878.

*To all whom it may concern:*

Be it known that I, ORLO W. RICHARDSON, of Chicago, in the county of Cook and State of Illinois, have invented certain new and useful Improvements in Pattern-Multipliers or Sample-Exhibitors, of which the following is a specification, reference being had to the accompanying drawing, forming a part hereof, and in which—

Figure 1:
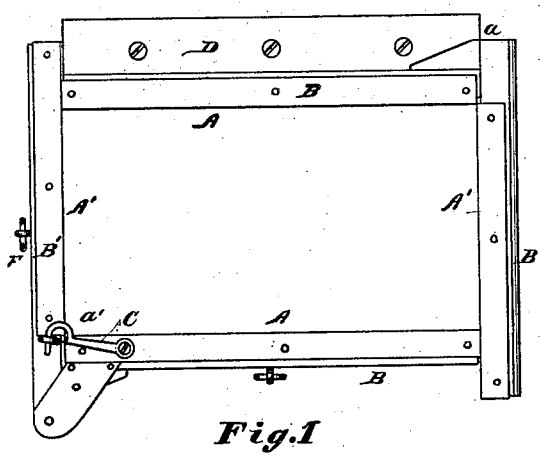
Figure 2:
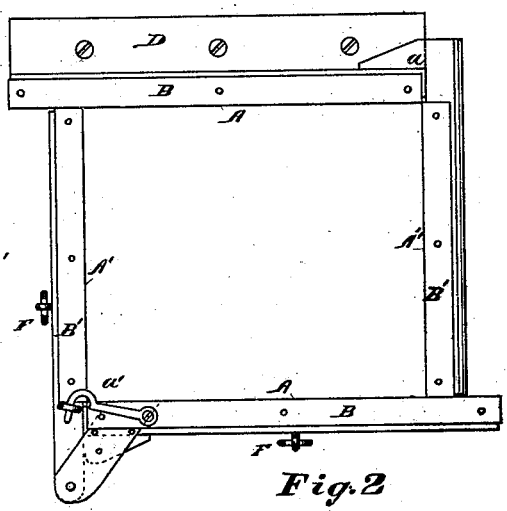
Figure 3:
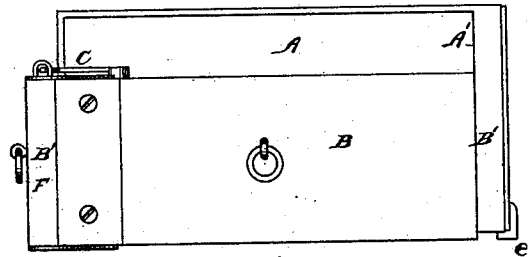
Figure 4:
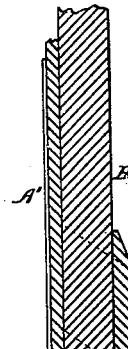
Figure 4:
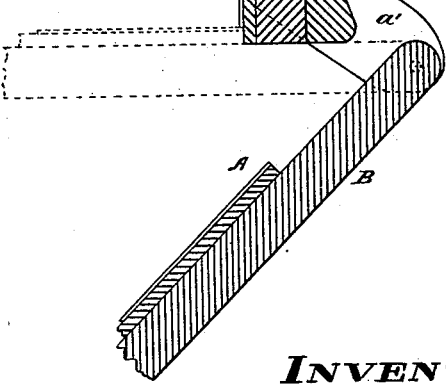

Figures 1 and 2 are top views of an exhibitor embodying my invention; Fig. 3, an end elevation thereof, and Fig. 4 a horizontal section through the hinged ends or corner.

Like letters of reference indicate like parts.

My invention relates to that class of exhibitors consisting of mirrors arranged to inclose, or partly inclose, and multiply, by reflection, samples or patterns of various kinds of goods—such as carpets, oil-cloths, wall-paper, &c.—so that the observer or purchaser may thereby gain a correct impression from samples, of the effect produced by the goods when applied to use.

The object of my present invention is to provide improved means for adjusting the exhibitor to samples of different size, and to improve the construction and operation of devices of this class in the several other respects hereinafter set forth.

In the drawing, A A' represent mirrors attached to suitable backs B B'. These mirrors are connected to each other in pairs, a long and comparatively short mirror being in each pair, and the mirrors in each pair being arranged at right angles to each other. The pairs or rectangular mirrored surfaces or L-shaped parts thus formed are each independent of the other.

The long mirrors are both of the same length, and the short mirrors are also equal to each other in length. The pairs may thus be arranged together, either so that the outer or free ends of the short mirrors will lap the outer or free ends of the long mirrors, as represented in Fig. 1, or so that the ends of the short mirrors will be lapped by the long mirrors, as shown in Fig. 2, the long mirrors being opposite and parallel to each other, and the short mirrors being also opposite and parallel to each other and each rectangular part being against the other, and inclosing a space having the form of a parallelogram, as shown.

It will be perceived that each pair of mirrors, being L-shaped, will stand vertically without other aid, and that each pair, being independent of the other, may be adjusted with relation to the other. The distance between the long mirrors may thus be altered easily at will, either by pushing one long mirror toward or drawing it from the other, when the parts are arranged as shown in Fig. 1, and when they are arranged as shown in Fig. 2 the short mirrors may likewise be adjusted with relation to each other.

Ingrain carpets, as is well known, are made in much wider breadths than Brussels carpets; and the object in making some of the mirrors longer than others is to adapt the exhibitor to goods having different standards of width, while the object in connecting the mirrors unadjustably in pairs and in allowing each pair to be independent of the other is to avoid the necessity of setting each mirror separately, or adjusting each to the sample by a movement of all separately, as has heretofore been necessary.

The result of this construction, combination, and arrangement of parts is an easy adjustment of the device while using it for the purposes for which it is intended.

The two mirrors which constitute a pair may be either rigidly connected at the ends in junction with each other, as represented at *a*, or they may be there hinged together, as shown at *a'*. When hinged, they may be folded compactly together for transportation, and also for storage or convenience in arranging them away while they are not being used. A hook, C, may be employed to hold the hinged parts together properly for use.

For some purposes only three mirrored surfaces or faces may be all that will be required, in which cases one of the hinged parts of those forming a pair may be turned back upon its fellow to support or hold it vertically.

I make the mirrors of one pair considerably higher than those of the other, as represented in Fig. 3, so that an extended view may be obtained with facility without shutting out too much light from the sample. I also attach a cleat, c, upon the lower edges of the back pieces in one pair, the cleats not extending to the inner lower corners of the backs, as represented in Fig. 3, so that the edges of the samples may be easily arranged underneath the lower edges of the mirrors, and thus produce a continuous, smooth, and unbroken reflection.

D is a broad base, brace, or bracket, to admit of one pair being fastened to a table or other suitable support. F F are handles, to facilitate the operation of moving or adjusting the adjustable parts.

For some purposes mirrors all of the same length may be employed, mirrors of unequal length being desirable only for the purpose already particularly set forth.

The form of the brace or bracket D is not material so long as it serves as a means for allowing the part to which it is applied to be secured to a table or other support, and it may be of such a form as to support an independent mirror vertically without fastening the bracket to a table.

Half samples, as well as full patterns, may be exhibited, the length of the mirrors being varied accordingly.

Having thus described my invention, what I claim as new, and desire to secure by Letters Patent, is—

1. A pattern or sample exhibitor consisting of two pairs of mirrors, A A', one pair adjustable with relation to the other, those in the same pair being connected to each other, and each connected pair being independent of the other, and those in one connected pair being higher than those in the other at their upper edges, and one connected pair having their lower edges raised above the lower edges of those in the other pair, thereby adapting the same exhibitor to samples or patterns of different width from each other, giving a greater field of vision and allowing the edges of the samples or patterns to be covered by the edges of one pair of mirrors, substantially as and for the purposes specified.

2. The combination, in a pattern-exhibitor consisting of four mirrors, of a pair of mirrors, arranged vertically and hinged to each other at two vertical edges, and the hook C, the latter for holding the said mirrors at right angles to each other.

ORLO W. RICHARDSON.

Witnesses:
F. F. WARNER,
WM. F. HARBACH.